(12) United States Patent
Wang et al.

(10) Patent No.: US 12,034,542 B2
(45) Date of Patent: Jul. 9, 2024

(54) SYSTEMS AND METHODS FOR IMPROVED DETECTION OF SIGNAL IN WIRELESS SYSTEM

(71) Applicant: EdgeQ, Inc., Santa Clara, CA (US)

(72) Inventors: Shu Wang, San Diego, CA (US); Sriram Rajagopal, Karnataka (IN)

(73) Assignee: EdgeQ, Inc., Santa Clara, CA (US)

(*) Notice: Subject to any disclaimer, the term of this patent is extended or adjusted under 35 U.S.C. 154(b) by 30 days.

(21) Appl. No.: 17/893,978

(22) Filed: Aug. 23, 2022

(65) Prior Publication Data

US 2024/0072937 A1    Feb. 29, 2024

(51) Int. Cl.
*H04L 1/1812* (2023.01)
*H04L 1/00* (2006.01)
(Continued)

(52) U.S. Cl.
CPC .......... *H04L 1/1812* (2013.01); *H04L 1/0054* (2013.01); *H04L 1/08* (2013.01);
(Continued)

(58) Field of Classification Search
CPC ... H04L 1/1812; H04L 1/0054; H04L 1/1819; H04L 1/08; H04L 1/1607; G06N 20/00;
(Continued)

(56) References Cited

U.S. PATENT DOCUMENTS

| | | | |
|---|---|---|---|
| 11,563,527 B2 * | 1/2023 | Kim | H04L 1/1819 |
| 2009/0154392 A1 * | 6/2009 | Park | H04L 1/1812 |
| | | | 370/328 |

(Continued)

FOREIGN PATENT DOCUMENTS

WO    2019192016 A1    10/2019

OTHER PUBLICATIONS

Sali et al., Predicting Burst Error Statistics of Digital Wireless Systems with HARQ, 2013, IEEE, pp. 276-281. (Year: 2013).*

(Continued)

*Primary Examiner* — John J Tabone, Jr.
(74) *Attorney, Agent, or Firm* — North Weber & Baugh LLP; Michael North

(57) ABSTRACT

A reliable wireless communication system needs good wireless signal detection and interference management. Traditional thinking for interference management mostly relies on interference cancellation or receiver design. In such a design, an interference issue occurs when a receiver is incapable of handling it. Various interference management embodiments are presented in the disclosure. Using HARQ retransmission incorporated with parameter changes, interference management may be improved through interference source control for more effective signal detection and interference management. Additionally, early termination parameters for decoding operation may be learned and implemented separately or jointly with HARQ retransmission. Furthermore, estimated interference power may be improved using machine-learning algorithm based on decoding statistics of the decoder. Biasing for the estimated interference power may be implemented separately or jointly with early termination parameter learning and/or HARQ retransmission request with parameter changes to improve signal detection and interference management.

20 Claims, 4 Drawing Sheets

(51) Int. Cl.
  *H04L 1/08*     (2006.01)
  *H04L 1/1607*   (2023.01)
  *G06N 20/00*    (2019.01)
  *H04B 17/345*   (2015.01)
  *H04W 52/02*    (2009.01)
  *H04W 80/02*    (2009.01)

(52) U.S. Cl.
  CPC .......... *H04L 1/1607* (2013.01); *H04L 1/1819* (2013.01); *G06N 20/00* (2019.01); *H04B 17/345* (2015.01); *H04W 52/0209* (2013.01); *H04W 80/02* (2013.01)

(58) Field of Classification Search
  CPC . H04B 17/345; H04W 52/0209; H04W 80/02
  USPC ................................. 714/748, 749, 750, 821
  See application file for complete search history.

(56) References Cited

U.S. PATENT DOCUMENTS

| | | | |
|---|---|---|---|
| 2009/0158109 A1* | 6/2009 | Park ...................... | H04L 1/1845 |
| | | | 714/748 |
| 2012/0287859 A1 | 11/2012 | Ji et al. | |
| 2014/0146756 A1* | 5/2014 | Sahin .................... | H04L 1/1607 |
| | | | 370/328 |
| 2017/0048899 A1* | 2/2017 | Li ......................... | H04W 76/11 |
| 2019/0036663 A1 | 1/2019 | Azarian Yazdi et al. | |
| 2020/0036651 A1* | 1/2020 | Chautru ................ | H04L 47/805 |
| 2021/0036809 A1* | 2/2021 | Shellhammer ....... | H04B 7/0456 |

OTHER PUBLICATIONS

International Search Report and Written Opinion of the International Searching Authority mailed Aug. 24, 2023 in related PCT application No. PCT/US2023/021418, (14 pgs).

* cited by examiner

SYSTEMS AND METHODS FOR IMPROVED DETECTION OF SIGNAL IN WIRELESS SYSTEM

TECHNICAL FIELD

The present disclosure relates generally to wireless communication. More particularly, the present disclosure relates to systems and methods for improving signal detection in wireless communication.

BACKGROUND

The importance of wireless communication in today's society is well understood by one of skill in the art. A reliable wireless communication system needs good wireless signal detection and interference management.

Traditional thinking for interference management mostly relies on interference cancellation or receiver design. In such a design, an interference issue occurs when a receiver is incapable of handling it. If the receiver could perfectly estimate and cancel interference, there would be no interference issue.

However, due to the complexity of modem system architecture and hardware limitations, most advanced receiver designs can hardly go beyond minimum mean square error (MMSE) schemes.

Accordingly, what is needed are systems and methods of improving signal detection in wireless communication for improved reliability and performance.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

Figure ("FIG.") 1 depicts a wireless communication between a transmitter and a receiver via a wireless link.

DETAILED DESCRIPTION OF EMBODIMENTS

Figure 1:
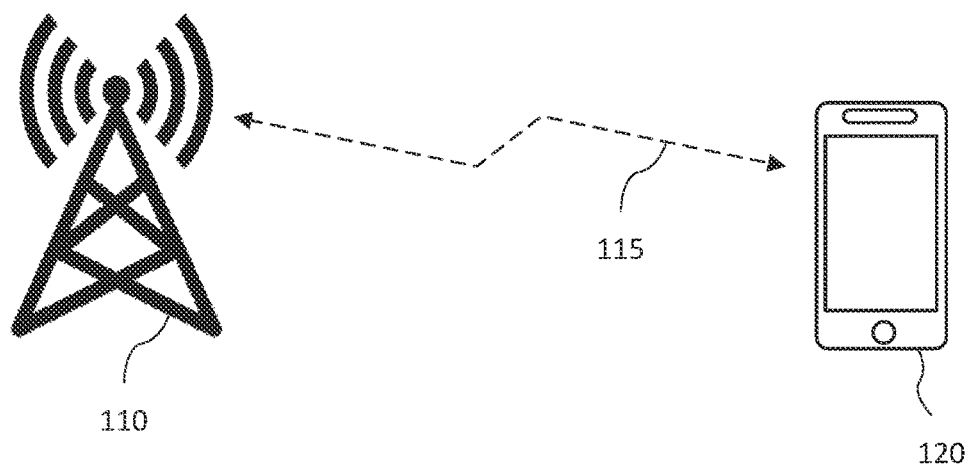

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion, components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" or "packet" shall not be interpreted as limiting embodiments of the present invention to 5G networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. General Description of Interference Management

FIG. 1 depicts a wireless communication between a transmitting apparatus 110 and a receiving apparatus 120 via a wireless link 115. The transmitting apparatus 110 may be a base station, and the receiving apparatus 120 may be a mobile phone or vice versa. The wireless link 115 may be subject to various interferences, e.g., ambient noise, interference from nearby channels or transmitters, etc.

A typical receiving apparatus comprises a front digital receiver that receives a signal with interference and noise. MMSE technique has been implemented in various advanced receivers e.g., MMSE receivers. Such an implementation requires (a) channel measurement; (b) removing the channel measurement and measuring interference correlation, power, and other statistics; (c) applying the measured statistics to the MMSE receiver. Due to the dynamic nature of wireless communication, interference may vary from allocation to allocation, e.g., slot to slot in 5G NR/LTE or physical layer protocol data unit (PPDU) to PPDU in Wi-Fi, etc.

For reliable wireless communication, good wireless signal detection and interference management are needed. Traditional thinking for interference management mostly relies on interference cancellation or receiver design. In such a design, an interference issue occurs when a receiver is incapable of handling it. If the receiver could perfectly estimate and cancel interference, there would be no interference issue. Accordingly, interference management is typically handled on the receiver side.

However, due to the complexity of modem system architecture and hardware limitations, most advanced receiver designs can hardly go beyond MMSE schemes. Traditional methods to improve the performance include trying to increase/decrease decoder termination with some heuristics. The quality of interference cancellation depends on interference measurement or estimation. Such an approach is not guaranteed to be of good quality all the time.

Described in the following sections are system and method embodiments of improving signal detection with interference mitigated through interference source control for improved reliability and performance.

B. Embodiments of Interference Management with Interference Source Control

Figure 2:
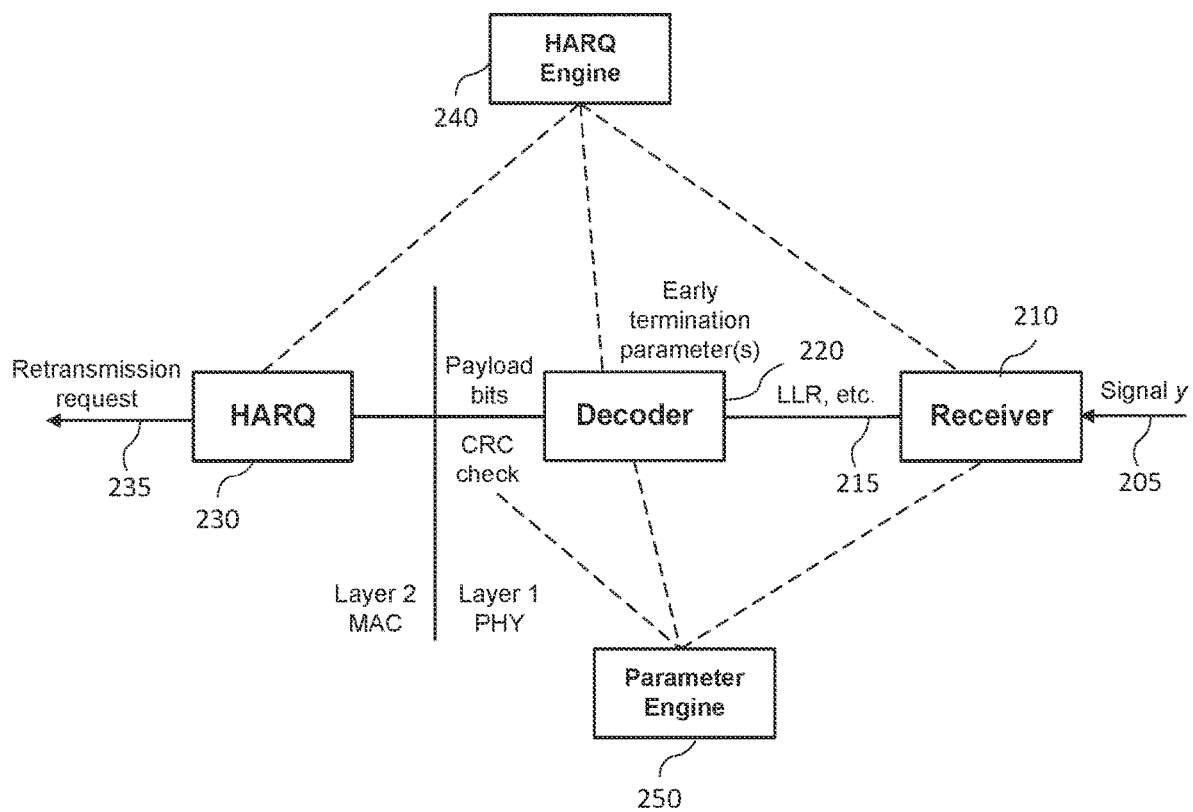
FIG. 2 depicts a block diagram of a receiving apparatus for interference management with interference mitigated through interference source control, according to embodiments of the present disclosure.

FIG. 2 depicts a block diagram of a receiving apparatus 200 for interference management with interference mitigated through interference source control, according to embodiments of the present disclosure. The receiving apparatus 200 comprises a receiver 210 and a decoder 220 at layer 1 (physical layer) and a hybrid automatic repeat request (HARQ) module 230 at layer 2 (MAC layer). In one or more embodiments, the receiver 210 may be an MMSE receiver.

The receiver 210 receives a signal y 205, which may be expressed as y=hx+I+N, wherein the x is the signal transmitted from a transmitting apparatus via a wireless channel, h represents one or more channel parameters of the wireless channel, I represents interference on the wireless channel, N represents noise on the wireless channel. For reliable communication between the transmitting apparatus and the receiving apparatus, it is desirable to estimate and cancel the interference I from the signal y.

As mentioned in Section A, MMSE technique has been implemented in various advanced receivers, e.g., MMSE receivers, for interference management. Such an implementation requires (a) channel measurement; (b) removing the channel measurement and measuring interference correlation, power, and other statistics; (c) applying the measured statistics to the MMSE receiver. Due to the dynamic nature of wireless communication, interference may vary from allocation to allocation, e.g., slot to slot in 5G NR/LTE or PPDU to PPDU in Wi-Fi, etc.

The receiver 210 sends an output 215 to the decoder 220, which may perform decoding operation using various iterative decoding schemes, e.g., Low-Density Parity Check (LDPC) decoding and/or turbo decoding, depending on system configuration, for error correction. The decoder 220 provides a means to control errors in data transmissions over unreliable, noisy, or interfered communication channels. For example, turbo decoding may use a parallel concatenated convolutional decoding scheme to decode the output 215, while the LDPC decoding may be used to decode a binary LDPC code, which may be a soft-decision output, e.g., an output of log-likelihood ratios or LLRs, from the receiver 210 to the decoder 220.

In one or more embodiments, the output 215 from the receiver 210 may comprise LLRs and relevant statistics, which are used as input to the decoder 220 of iterative decoding for error correction. The decoder 220 may be configured with a maximum iteration count and parameters for early termination of the decoding as well. When the wireless communication link (e.g., wireless link 115) suffers severe interference or deep turbulence, signal detection (e.g., maximum likelihood detection) may require a very long decoding process involving many iterations and high computational complexity, which may not be practical or available due to the limited hardware resources, e.g., microprocessor core, storage units, etc., allocated to such a wireless communication link. Based on one or more parameters within the decoder, decoding iterations may be terminated to save power and computation resources, and/or lower latency. Such an iteration termination may be referred to as an early termination. In one or more embodiments, parameters for early termination of the decoding process in the decoder 220 may be determined, learned, or updated using a parameter engine 250, which couples to both the receiver 210 and the decoder 220. The parameter engine 250 may use machine-learning algorithm(s) to determine, learn or adjust one or more early termination parameters, e.g., maximum iteration number and/or error syndrome in iterations, based on at least one of the error detection status (e.g., CRC result), the iteration count in a previous early termination of the decoding operation, and the receiver output (e.g., LLRs).

The decoder 220 outputs payload bits and error detection status, e.g., CRC check status, to the HARQ module 230, which combines forward error correction (FEC) and automatic repeat request (ARQ). When the error detection status (e.g., a false CRC check result) indicates one or more faulty packets, the HARQ module 230 may generate a retransmission request 235 for the one or more faulty packets. The retransmission request may be sent back from the receiving apparatus to the transmitting apparatus for retransmission implementation. Such a HARQ implementation may be used in various wireless communication technologies, e.g., 5G, LTE, or Wi-Fi 7 defined in IEEE standard 802.11be, etc.

In one or more embodiments, the retransmission request may further comprise one or more desirable parameter changes regarding the retransmission of the faulty packets. The one or more desirable parameter changes may be determined by a HARQ engine 240 that couples to the receiver 210, the decoder 220, and the HARQ module 230.

In one or more embodiments, the HARQ engine 240 may determine the one or more desirable parameter changes based on at least one of the error detection status (e.g., CRC result), the iteration count in a last early termination, and the receiver output (e.g., LLRs). For example, the one or more desirable parameter changes may be a change of code rate (e.g., lower code rate) for more parity or improved spectral efficiency for retransmission of the faulty packets. In one or more embodiments, the HARQ engine 240 may use machine learning algorithm(s) to determine one or more parameters desired to be changed for retransmission of the faulty packets, and desired changes for the determined one or more parameters changes.

Figure 3:
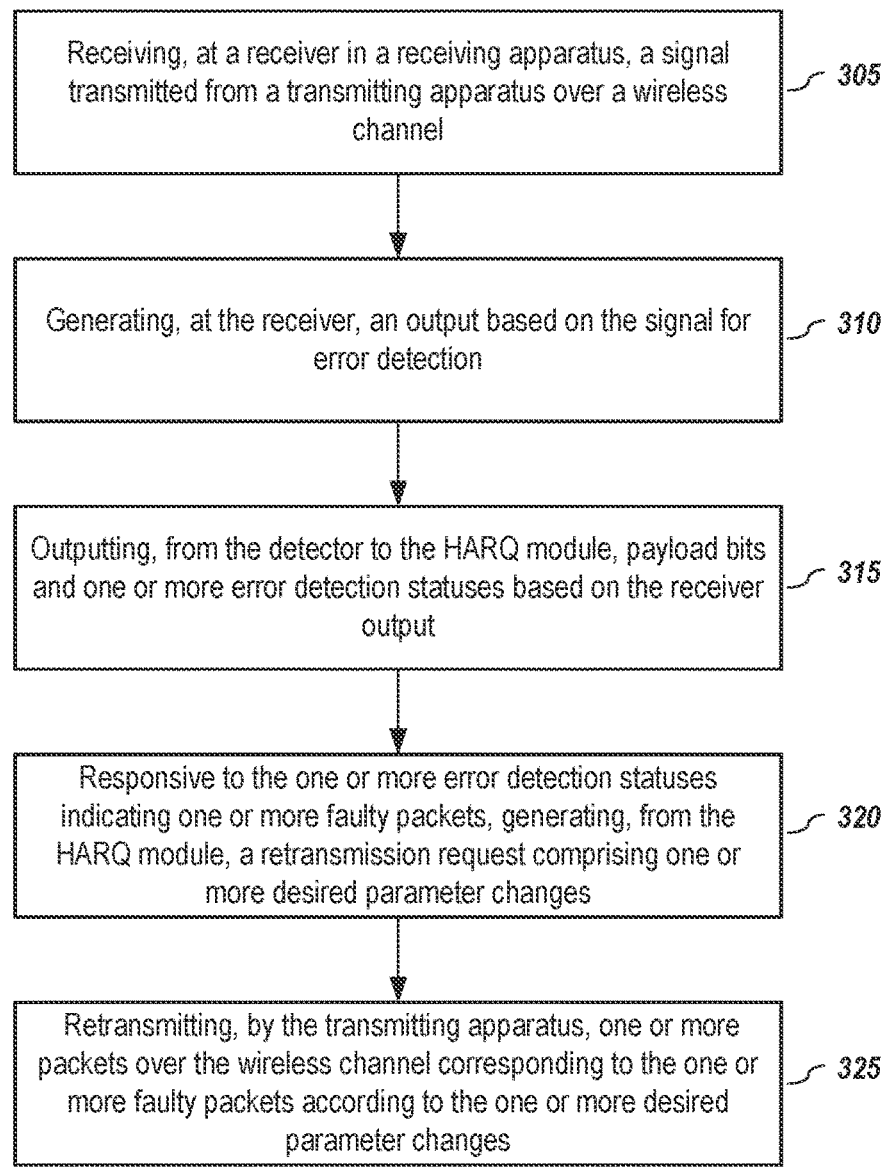
FIG. 3 depicts a flow control process for hybrid automatic repeat request (HARQ) retransmission, according to embodiments of the present disclosure.

FIG. 3 depicts a process for HARQ retransmission according to embodiments of the present disclosure. In step 305, a receiver in a receiving apparatus receives a signal transmitted from a transmitting apparatus via a wireless channel. In step 310, the receiver generates an output based on the signal for error detection. In step 315, the decoder outputs payload bits and one or more error detection statuses to the HARQ module based on the output from the receiver. In step 320, responsive to the one or more error detection status indicating one or more faulty packets, the HARQ module generates a retransmission request for one or more packets corresponding to the one or more faulty packets. The retransmission request comprises one or more desired parameter changes for retransmission of one or more faulty packets. In step 325, the transmitting apparatus retransmits one or more packets corresponding to the one or more faulty packets via the wireless channel according to the one or more desirable parameter changes.

With the process in FIG. 3, interference management may also be mitigated through interference source control, such that the transmitting apparatus and the receiving apparatus may be operated jointly in a more active approach for more effective signal detection and interference management.

Figure 4:
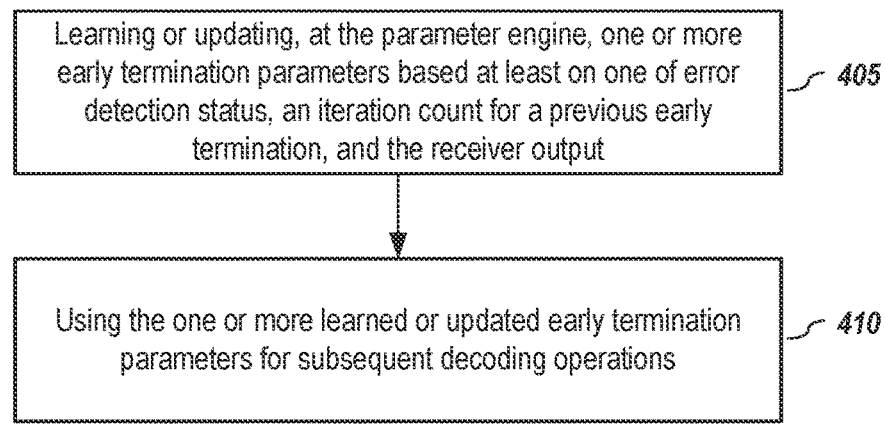
FIG. 4 depicts a flow control process for early termination parameter learning, according to embodiments of the present disclosure.

FIG. 4 depicts a process for early termination parameter learning or updating, according to embodiments of the present disclosure. In step 405, one or more early termination parameters are learned or updated, at the parameter engine, based on at least one of error detection statuses (e.g., CRC status), an iteration count for a previous early termination, and the receiver output. In step 410, the one or more learned or updated early termination parameters are used for subsequent decoding operations when the same user or interference pattern is detected. In one or more embodiments, information of the one or more learned or updated early termination parameters may be fed to a higher layer where the information may be stored and bed back for next allocations.

Sequentially, the learned or updated early termination parameters may be used for adjusting the receiver side interference estimation states. For example, a centralized unit (CU) and/or a distributed unit (DU) may smartly learn and adjust an early termination target for HARQ and therefore terminate interference sources in a stage as early as possible. The process for early termination parameter learning shown in FIG. 4 may be implemented separately from the process for HARQ retransmission shown in FIG. 3. Alternatively, the process for early termination parameter learning may be implemented together with the process for HARQ retransmission for further improving the efficiency of interference management.

As with all estimations, interference estimation or measurement may have variations in accuracy. In one or more embodiments, the estimation of interference power, which is crucial for interference management and the MMSE receiver, may be improved or biased based on at least one of error detection statuses (e.g., CRC status), a decoding iteration count for a last early termination, and the receiver output. In one or more embodiments, a bias for the estimated interference power may be determined, using machine-learning algorithm, based on decoding operation statistics of the decoder. Biasing for the estimated interference power may be implemented separately or jointly with early termination parameter learning and/or HARQ retransmission request with parameter changes for improvement in signal detection and interference management.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently, including having multiple dependencies, configurations, and combinations.

What is claimed is:

1. A method for interference management in wireless communication comprising:

receiving, at a receiver in a receiving apparatus, a signal transmitted from a transmitting apparatus over a wireless channel;

generating, at the receiver, an output based on the signal for error correction;

outputting, from a decoder in the receiving apparatus, payload bits and one or more an error detection statuses based on the output of the receiver; and responsive to the one or more error detection statuses indicating one or more faulty packets, generating by a hybrid automatic repeat request (HARQ) module in the receiving apparatus a retransmission request comprising one or more parameter changes for retransmitting one or more packets corresponding to the one or more faulty packets.

2. The method of claim 1 further comprising:

retransmitting, from the transmitting apparatus, one or more packets corresponding to the one or more faulty packets according to the one or more parameter changes via the wireless channel.

3. The method of claim 1, wherein the receiver is a minimum mean square error (MMSE) receiver, the output from the receiver comprises log-likelihood ratios (LLRs) and relevant statistics.

4. The method of claim 3, wherein the one or more desired parameter changes are learned at a HARQ engine that couples to the receiver and the decoder based on at least one of:

the one or more error detection statuses;

one or more operation statistics of the decoder, the one or more operation statistics comprising a decoding iteration count of a last early termination at the decoder; and the output from the receiver.

5. The method of claim 1, wherein the one or more parameter changes comprise a change of code rate during retransmission for more parity or improved spectral efficiency.

6. The method of claim 1 further comprising:
learning or updating, at a parameter engine, one or more early termination parameters of the decoder based at least on one of:
an iteration count for a previous early termination;
one or more error detection statuses; and
the receiver output; and
using the one or more learned or updated early termination parameters for subsequent decoding operations performed by the decoder.

7. The method of claim 1 further comprising:
estimating an interference power based on at least one of:
the one or more error detection statuses;
a decoding iteration count of a last early termination at the decoder; and
the output of the receiver.

8. A wireless communication apparatus comprising:
a receiver generating an output based on a signal received from a transmitting apparatus over a wireless channel;
a decoder performing iterative decoding to output payload bits and one or more error detection statuses based on the output of the receiver; and
a hybrid automatic repeat request (HARQ) module, responsive to the one or more error detection statuses indicating one or more faulty packets, the HARQ module generates a retransmission request comprising one or more parameter changes for retransmitting one or more packets corresponding to the one or more faulty packets.

9. The wireless communication apparatus of claim 8, wherein the receiver is a minimum mean square error (MMSE) receiver, the output from the receiver comprises log-likelihood ratios (LLRs) and relevant statistics.

10. The wireless communication apparatus of claim 9 further comprising a HARQ engine that couples to the receiver and the decoder, the HARQ engine learns the one or more parameter changes based on at least one of:
the one or more error detection statuses;
one or more operation statistics of the decoder, the one or more operation statistics comprising a decoding iteration count of a last early termination at the decoder; and
the output from the receiver.

11. The wireless communication apparatus of claim 8, wherein the one or more parameter changes comprise a change of code rate during retransmission for more parity or improved spectral efficiency.

12. The wireless communication apparatus of claim 8 further comprising a parameter engine that couples to the receiver and the decoder, the parameter engine learns or updates one or more early termination parameters of the decoder based at least on one of:
the one or more error detection statuses;
an iteration count for a previous early termination; and
the output from the receiver.

13. The wireless communication apparatus of claim 12, wherein the decoder is updated using the one or more learned or updated early termination parameters for subsequent decoding operations.

14. A non-transitory computer-readable medium or media comprising one or more sequences of instructions which, when executed by one or more processors, causes steps for interference management in a wireless communication apparatus to be performed comprising:
generating a soft-decision output based on a signal received from a transmitting apparatus over a wireless channel for error detection;
performing iterative decoding for the soft-decision output to output payload bits and one or more error detection statuses based on the output of the receiver; and
responsive to the one or more error detection statuses indicating one or more faulty packets, generating a retransmission request comprising one or more parameter changes for retransmitting one or more packets corresponding to the one or more faulty packets.

15. The non-transitory computer-readable medium or media of claim 14, wherein the the soft-decision output comprises log-likelihood ratios (LLRs) and relevant statistics.

16. The non-transitory computer-readable medium or media of claim 14, wherein the one or more parameter changes are learned based on at least one of:
the one or more error detection statuses;
one or more operation statistics of the decoder, the one or more operation statistics comprising a decoding iteration count of a last early termination at the decoder; and
the soft-decision output.

17. The non-transitory computer-readable medium or media of claim 14, wherein the one or more parameter changes comprise a change of code rate during retransmission for more parity or improved spectral efficiency.

18. The non-transitory computer-readable medium or media of claim 14, wherein the non-transitory computer-readable medium or media further comprises one or more sets of instructions which, when executed by at least one of the one or more processors, causes steps to be performed comprising:
learning or updating one or more early termination parameters for iterative decoding based at least on one of:
an iteration count for a previous early termination;
one or more error detection statuses; and
the soft-decision output; and
using the one or more learned or updated early termination parameters for subsequent iterative decoding.

19. The non-transitory computer-readable medium or media of claim 18, wherein the one or more early termination parameters comprise a maximum iteration number.

20. The non-transitory computer-readable medium or media of claim 14, wherein the non-transitory computer-readable medium or media further comprises one or more sets of instructions which, when executed by at least one of the one or more processors, causes steps to be performed comprising:
estimating an interference power based on at least one of:
the one or more error detection statuses;
a decoding iteration count of a last early termination of the iterative decoding; and
the soft-decision output.

* * * * *